United States Patent
Mahr et al.

(10) Patent No.: US 7,821,893 B2
(45) Date of Patent: Oct. 26, 2010

(54) METHOD FOR ANALYZING AN ABNORMAL REGION ON AN OPTICAL RECORDING MEDIUM

(75) Inventors: Peter Mahr, Zell im Wiesental (DE); Michael Huonker, Rosenfeld-Isingen (DE); Christian Vollmer, Hinterzarten (DE); Wiebke Schone, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 212 days.

(21) Appl. No.: 10/584,686

(22) PCT Filed: Nov. 26, 2004

(86) PCT No.: PCT/EP2004/013506

§ 371 (c)(1),
(2), (4) Date: Jun. 28, 2006

(87) PCT Pub. No.: WO2005/069298

PCT Pub. Date: Jul. 28, 2005

(65) Prior Publication Data

US 2007/0153656 A1 Jul. 5, 2007

(30) Foreign Application Priority Data

Jan. 7, 2004 (EP) .................................. 04000107

(51) Int. Cl.
*G11B 7/00* (2006.01)
(52) U.S. Cl. .................................................. 369/53.15
(58) Field of Classification Search ........................ None
See application file for complete search history.

(56) References Cited

U.S. PATENT DOCUMENTS

| 5,199,017 A | * | 3/1993 | Kagami et al. ........... 369/44.28 |
| 5,212,677 A | * | 5/1993 | Shimote et al. .......... 369/53.17 |
| 5,485,444 A | | 1/1996 | Kuhn et al. |

(Continued)

FOREIGN PATENT DOCUMENTS

EP 0397126 11/1990

(Continued)

OTHER PUBLICATIONS

English translation of Tsuchiya et al., Japan H01-253638, published Oct. 9, 1989, translated by Schreiber Translations, Inc.*

(Continued)

*Primary Examiner*—Peter Vincent Agustin
(74) *Attorney, Agent, or Firm*—Robert D. Shedd; Robert B. Levy; Jorge Tony Villabon (57) ABSTRACT

The present invention relates to a method for analyzing abnormal regions on an optical recording medium. The method includes the steps of:
 detecting the abnormal region;
 determining the type of the abnormal region; and
 measuring the length of the abnormal region.
Before playback or recording of an optical recording medium inserted in an apparatus for reading from and/or writing to optical recording media the apparatus determines the positions, lengths and types of abnormal regions on the optical recording medium. The obtained information can then be used, for example, to avoid that during playback or recording a pickup for reading and/or recording unexpectedly encounters an abnormal region. This makes the operation of the apparatus more reliable.

11 Claims, 7 Drawing Sheets

U.S. PATENT DOCUMENTS

| | | |
|---|---|---|
| 6,263,469 B1 | 7/2001 | Jang |
| 6,336,202 B1 | 1/2002 | Tsuchimoto et al. |
| 7,038,983 B2 * | 5/2006 | Ueda et al. ............... 369/53.15 |
| 7,215,619 B1 * | 5/2007 | Van Den Enden ........ 369/53.15 |
| 7,457,212 B2 * | 11/2008 | Oh .......................... 369/47.14 |
| 2003/0141997 A1 | 7/2003 | Kawabe et al. |

FOREIGN PATENT DOCUMENTS

| | | |
|---|---|---|
| JP | 54048213 A * | 4/1979 |
| JP | 1-253638 | 10/1989 |

OTHER PUBLICATIONS

Search Report dated Feb. 2, 2005.

* cited by examiner

Fig. 1

-- Prior Art --

METHOD FOR ANALYZING AN ABNORMAL REGION ON AN OPTICAL RECORDING MEDIUM

This application claims the benefit, under 35 U.S.C. §365 of International Application PCT/EP04/013506, filed Nov. 26, 2004, which was published in accordance with PCT Article 21(2) on Jul. 28, 2005 in English and which claims the benefit of European patent application No. 04000107.5, filed Jan. 7, 2004.

The present invention generally relates to a method for playback or recording of an optical recording medium. More specifically, it relates to a method for analyzing abnormal regions on an optical recording medium, and to an apparatus for reading from and/or writing to optical recording media using such method.

Nowadays a plurality of formats of optical recording media can be found on the market. These formats include, for example, CD (Compact Disk), CD-R(W) (Compact Disk Recordable/Rewritable), DVD-ROM (Digital Versatile Disk Read-Only Memory), DVD-R(W) (Digital Versatile Disk-Recordable/Rewritable), DVD+R(W) (Digital Versatile Disk+Recordable/Rewritable), or BD (Blu ray disk). Besides these generally available formats, a number of proprietary formats exists, which are used for game disks or professional applications.

During production of these optical recording media, abnormal areas might occur on the optical recording media. Though such abnormal optical recording media should generally not pass quality control, it cannot be excluded that these media enter the market anyway. Furthermore, blank high density optical recording media for recording often do not fulfill the necessary specifications all over the recording area. Therefore, these media might comprise regions that cannot be recorded or played back. Finally, users might make mistakes when handling the recording media, which could cause scratches or the like, or when recording data on a blank optical recording medium. For example, a user might record data in the CD format on a DVD, or use an incorrect bit rate for recording. This also leads to regions on the optical recording medium which cannot be played back by any apparatus for reading from and/or writing to optical recording media.

Figure 1:
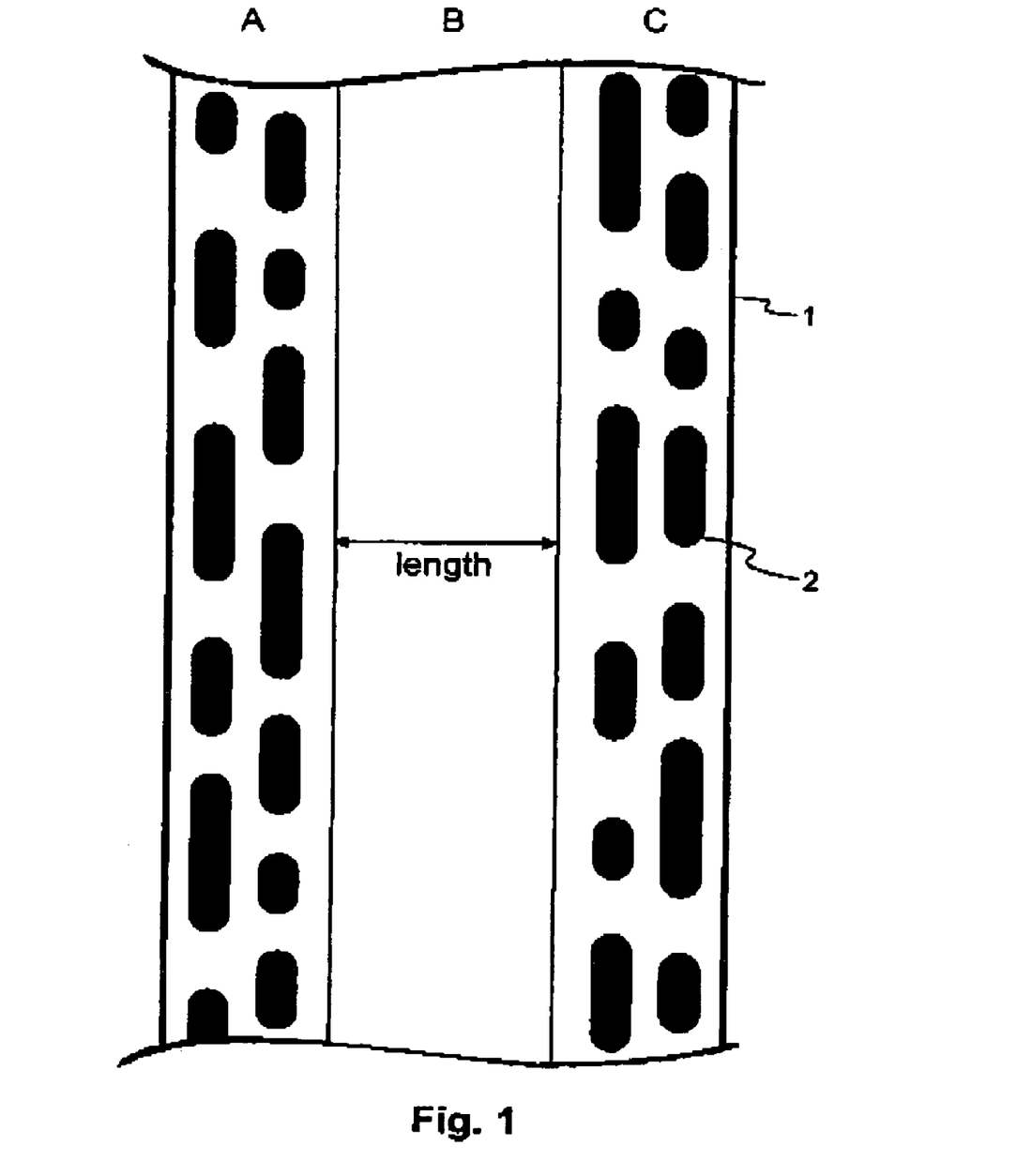
FIG. 1 shows an abnormal region on an optical recording medium.

In the following all regions which do not conform to the standard of the recording medium they are located on will be called 'abnormal regions', though they are not necessarily abnormal in the sense that they cannot be played back at all. An example of an abnormal region is shown in FIG. 1. An optical recording medium 1 comprises a plurality of tracks, in which data are stored in form of pits 2. Between two data regions A and C an abnormal region B is located, e.g. a mirror region. If an apparatus for reading from and/or writing to optical recording media encounters such a region on the specific optical recording medium, it is likely to stop playback or recording of the recording medium.

It is an object of the invention to propose a method for playback or recording of an optical recording medium which overcomes the above mentioned problems.

This object is achieved by a method for analyzing an abnormal region on an optical recording medium, including the steps of:
  detecting the abnormal region;
  determining the type of the abnormal region; and
  measuring the length of the abnormal region;

wherein the step of determining the type of the abnormal region includes:
  making a speed controlled jump over the abnormal region;
  obtaining information on the type of abnormal region during the speed controlled jump.

Before playback or recording of an optical recording medium inserted in an apparatus for reading from and/or writing to optical recording media the apparatus determines the positions and lengths of abnormal regions on the optical recording medium. When the location of an abnormal region is determined, a speed controlled jump is made over the abnormal region by the pickup unit for determining the type of this region. The obtained information can then be used, for example, to avoid that during playback or recording a pickup for reading and/or recording unexpectedly encounters an abnormal region. This makes the operation of the apparatus more reliable. The length of an abnormal region here is to be understood as the radial extension of the region essentially perpendicular to the tracks. Of course, the length of a region can as well be defined as the circumferential extension, i.e. in track direction. This leads to a more accurate determination of the beginning and end positions of the abnormal region.

Favorably the step of determining the type of the abnormal region includes:
  differentiating between a first group of types and a second group of types of abnormal region based on the obtained information.

It is first assumed that the abnormal region belongs to a first group of types, whose evaluation does only take a short time compared with the evaluation of a second group of types. In case the abnormal region belongs to one of the types of the first group of types, a corresponding detector signal is emitted, which directly allows to determine the region type. If no detector signal is emitted, it is concluded that the abnormal region belongs to the second group of types. The types of abnormal region include at least one of a groove region, a mirror region, and a defect region, which belong to the first group of types, and a wrong bitrate region and a wrong structure region, which belong to the second group of types.

Advantageously, the step of obtaining information on the type of abnormal region during the speed controlled jump includes evaluating a data signal and/or a track crossing signal obtained from the optical recording medium.

For example, the data signal HF obtained during the jump may be analyzed using a bottom-top detector. The HF pattern changes for some region types when crossing the abnormal region, while for other region types the HF pattern is rather similar to the normal HF pattern of the recording medium. Thus, by investigating the HF signal using a bottom-top detector the region type can be determined. Furthermore, the signal change is a reliable indication for the length of the region. Also the disappearance of the track crossing signal is an indication for the type of abnormal region.

Measuring the length of the abnormal region is favorably performed by either measuring the time needed for jumping over the abnormal region, or by counting a number of pulses emitted by a phase locked loop during jumping over the abnormal region, the phase locked loop replicating a track crossing signal obtained before reaching the abnormal region in the jumping step. Since the jump over the abnormal region is speed controlled, a measurement of the time needed for the jump allows to calculate the length of the region. Alternatively, the number of track crossings are counted. However, while crossing the abnormal region no track crossing signal is available. Therefore, the track crossing signal is substituted by the output pulses of a PLL representing virtual track crossings. Since these pulses are counted over the whole region, the region length can be calculated.

Advantageously, the method further includes the steps of:
  jumping back to the start of the abnormal region;
  reading data stored in the abnormal region; and evaluating the data for determining the type of abnormal region.

As mentioned before, if during the speed controlled jump no detector signal is emitted, it is concluded that the abnormal region belongs to the second group of types. For determining the specific type of the region from the group of types, it is in this case not sufficient to simply cross the region simulating the passing tracks. Instead, also the data stored in the region need to be analyzed. These data are favorably evaluated by either evaluating a sync signal included in the data, or by evaluating the data frequency in the abnormal region. Sync signals are part of each data packet and are detected by a sync-detector. In order to differentiate between different syncs, a plurality of sync-detectors or a variable sync detector are favorably implemented. Changes in the data frequency indicate that data are stored in the abnormal region are stored with a different bitrate.

Advantageously, the step of measuring the length of the abnormal region includes counting the number of wrong syncs in the abnormal region. A counter is initiated as soon as the first wrong sync signal is detected. The counter is stopped as soon as the wrong sync signal is missing. The number of wrong syncs allows to calculate the length of the wrong structure region.

According to one aspect of the invention, the position, the length and/or the type of the abnormal region are stored on the optical recording medium. This has the advantage that if the optical recording medium is inserted in the apparatus for reading from and/or writing to optical recording media, these regions do not need to be analyzed again. Of course, it is well possible to check whether the stored information is correct by analyzing the regions again.

Favorably, an apparatus for reading from and/or writing to optical recording media performs a method according to the invention or includes a device performing a method according to the invention for analyzing an abnormal region on an optical recording medium.

For a better understanding of the invention, an exemplary embodiment is specified in the following description with reference to the figures. It is understood that the invention is not limited to this exemplary embodiment and that specified features can also be expediently be combined and/or modified without departing from the scope of the present invention. In the figures.

There are basically five types of abnormal regions. Each requires a unique approach in order to determine its size and its type.

1. Groove region (the abnormal region is a groove)

2. Mirror region (the abnormal region is a mirror)

3. Defect region (the abnormal region is a defect, e.g. a black dot track)

4. Wrong bitrate region (the bitrate in the abnormal region differs from the specified bitrate)

5. Wrong structure region (in the abnormal region data are stored in a wrong structure, e.g. CD-like information regarding packet assembly, sync signal and the like are stored on a DVD)

The region type is identified by either analyzing a data signal HF generated by a 4-quadrant photo detection unit or with the help of a sync signal. Different techniques are used for calculating the lengths of the regions. Depending on the region type the measurement is either performed using a phase lock loop (PLL), investigating the sync signals, or measuring time units. Of course, other methods can also be used. The obtained information is either used for further information processing within a recording medium drive of the apparatus or is handed directly to a host within the apparatus.

Figure 2:
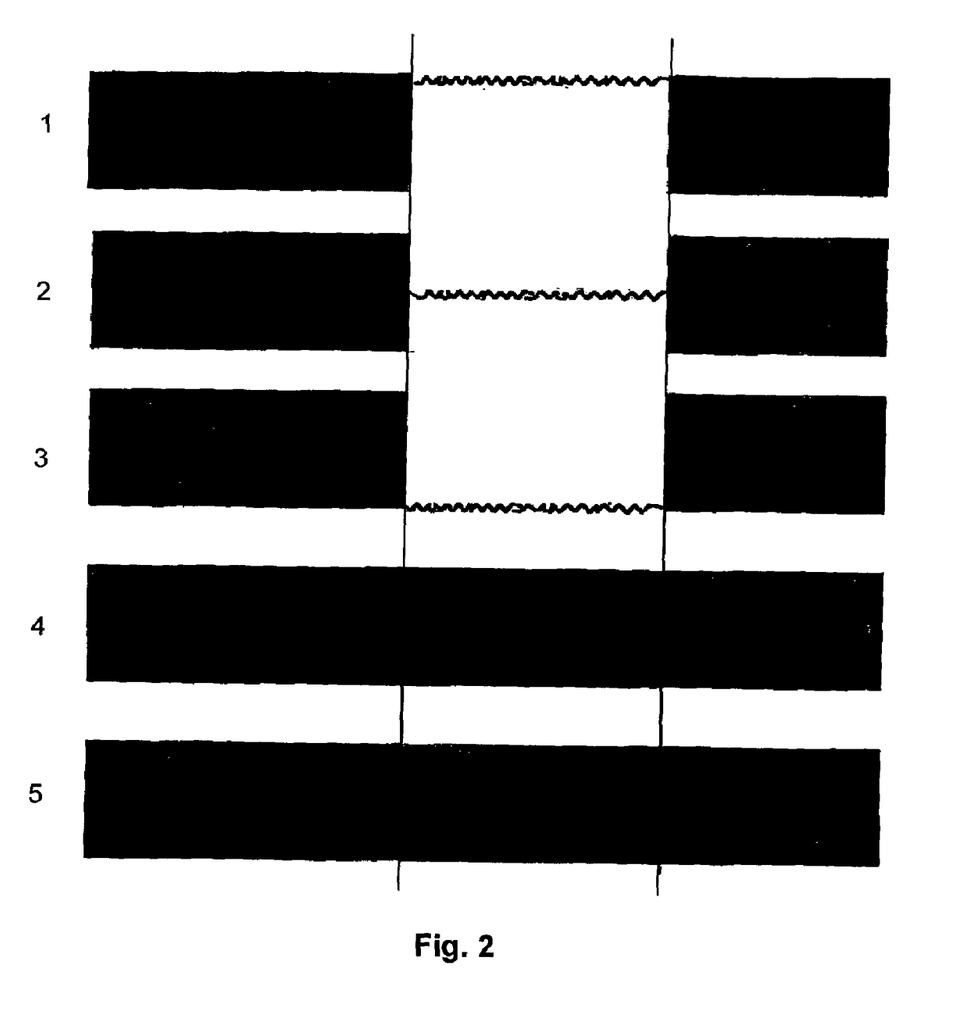
FIG. 2 depicts the behavior of a data signal for different types of abnormal regions.

In FIG. 2 the behavior of the data signal HF obtained from an optical recording medium is shown for the different types 1 to 5 of abnormal regions. It can be seen that the HF pattern for region types 1 to 3 changes when crossing the abnormal region. Thus, by investigating the HF signal using a bottom-top detector the region type can be determined. Furthermore, the signal change is a reliable indication for the length of the region. For the abnormal regions of types 4 and 5, however, the HF pattern is rather similar to the normal HF pattern of the recording medium. Therefore, different techniques are used in order to determine the type as well as the size of the regions.

Figure 3:
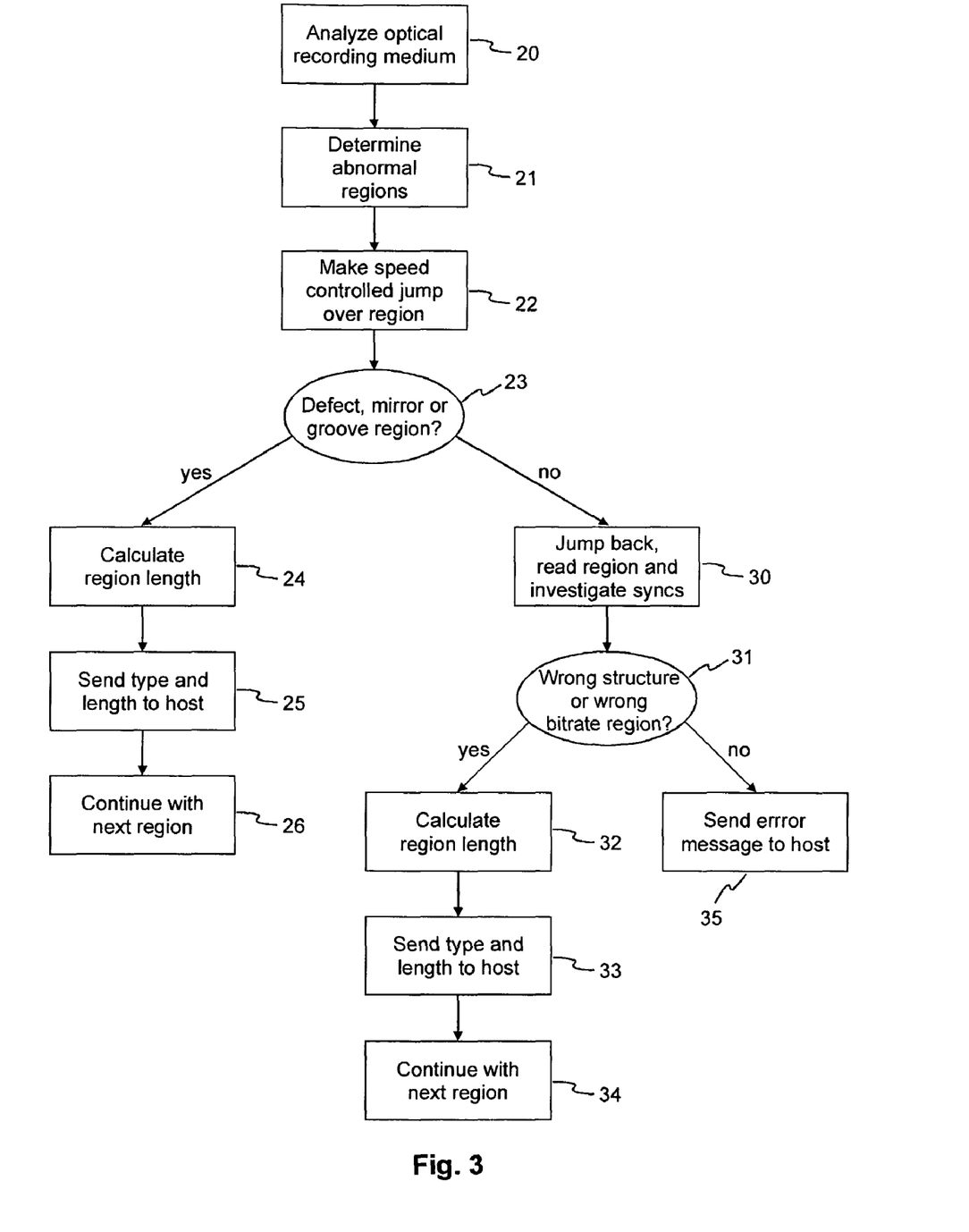
FIG. 3 shows a method for determining the types and lengths of abnormal regions on an optical recording medium.

In FIG. 3 a method for determining the types and lengths of abnormal regions on an optical recording medium is shown. In order to gain information on the type of optical recording medium and other relevant data after insertion of an optical recording medium in an apparatus for reading from and/or writing to optical recording media the optical recording medium is analyzed 20. This can be done, for example, by reading the table of content (TOC). In the next step the locations of abnormal regions are determined, e.g. by rapidly scanning the optical recording medium with a pickup unit, or by other suitable means. It is likewise possible to store the locations of known abnormal regions on the optical recording medium. In this case the step of analyzing 20 the optical recording medium includes reading the stored locations of abnormal regions. Favorably also the known abnormal regions are checked again for their type and their location and length.

Once the locations of the abnormal regions have been determined, a speed controlled jump 22 is made over the first abnormal region essentially perpendicular to the tracks by the pickup unit for determining the type and length of this region. It is first assumed that the abnormal region is either a defect region, a mirror region, or a groove region, since the evaluation of these types of region does only take a short time compared with the evaluation of wrong structure or wrong bitrate regions. In case the abnormal region belongs to one of the three types, a corresponding detector signal is emitted. For this purpose the data signal HF is analyzed using a bottom-top detector, for example. After determination 23 of the region type the length is calculated 24. A detailed description of this calculation will be given below with reference to FIGS. 4 and 5. The obtained type and length of the region are sent 25 to a host of the apparatus and the method continues 26 with the next region.

In case no detector signal is obtained, i.e. the abnormal region neither is a groove region, nor a mirror region, nor a defect region, it is assumed that either a wrong structure or a wrong bitrate region is present. Since neither the type nor the length of the region can be determined with the method applied to defect, mirror or groove regions, a different approach is used. The pickup unit jumps back 30 to the start address of the region and reads the complete region. The information gained from a sync signal located in the data packets is then interpreted and allows to determine 31 the type of region. Furthermore, the sync signal also allows to calculate 32 the length of the region. A detailed description of this calculation will be given below with reference to FIG. 6. Also in this case the obtained type and length of the region are sent 33 to a host of the apparatus and the method continues 34 with the next region.

In case the type of region cannot be determined 31, either because a different type of defect is encountered or because the presumed abnormal region is not abnormal, i.e. the information stored on the recording medium is incorrect, a corresponding error message is passed 35 to the host for further processing.

Figure 4:
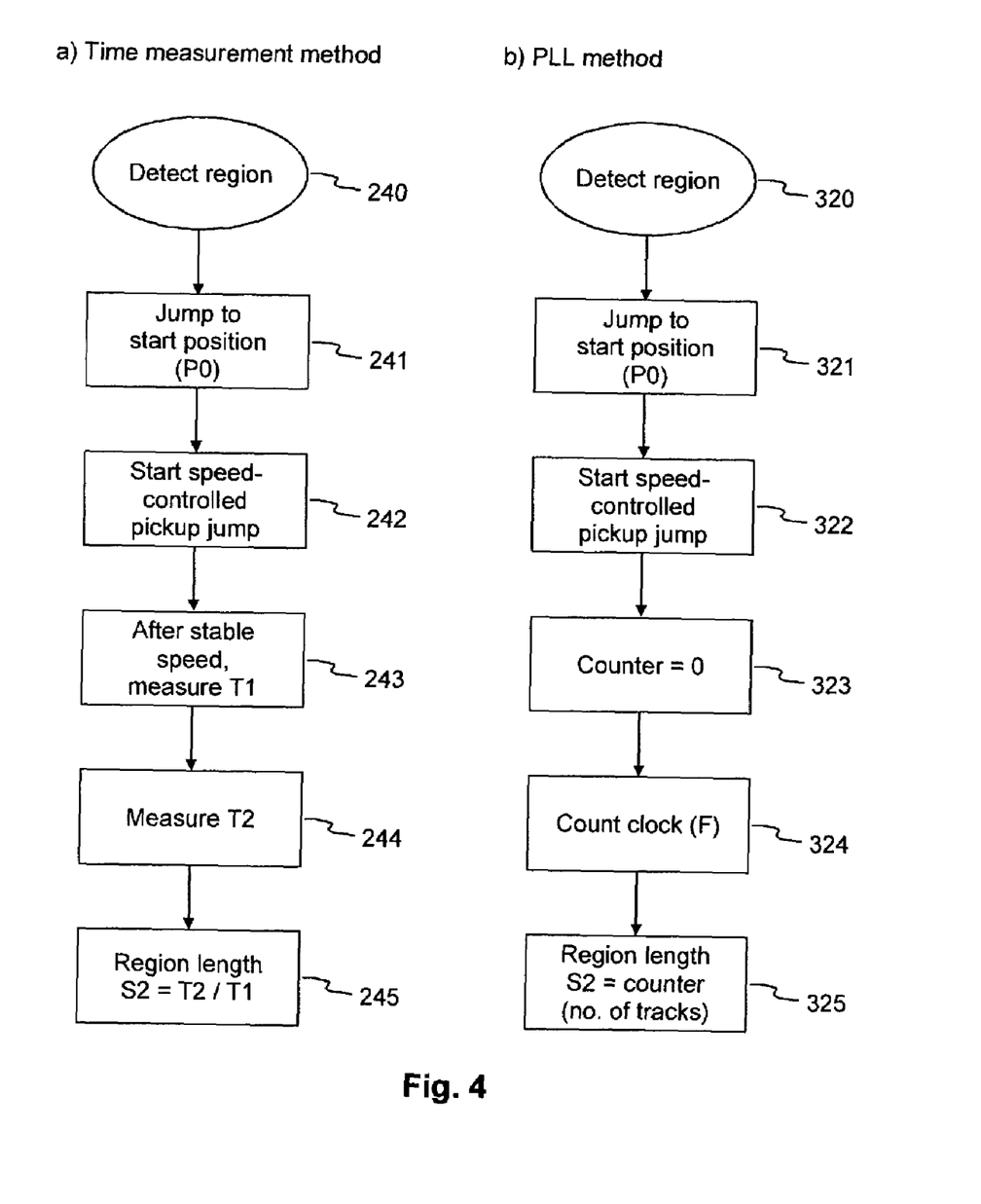
FIG. 4 depicts different methods for measuring the length of an abnormal region.

Different methods for determining the length of an abnormal region in case of a defect region, a mirror region or a groove region are depicted in FIG. 4. The methods are based on the principle that upon a constant track crossing speed and upon a constant track pitch the length of the abnormal region is proportional to the track pitch:

$$S2 = n \cdot S1 \quad n \in N \tag{1}$$

with
S1=track pitch [m]=const
S2=region length

The region length can be determined either in meters or with the unit "number of track crossing equivalents", as it is favorably used for further information processing.

$$S2 = T2/T1 = T2 \cdot v/S1 \tag{2}$$

with
S2=region length [track crossing number equivalent]
T2=time period of region crossing [s]
T1=time period of single track crossing [s]
v=velocity [m/s]=const.

As can be seen, the time T2 needed for the region crossing has to be determined in order to solve the equation. A first method for this purpose, the time measurement method, is depicted in FIG. 4a). After detection 240 of the abnormal region the pickup jumps 241 to a start position P0 just before the abnormal region. Then a speed-controlled jump is initiated 242. The distance between P0 and the beginning of the region is chosen sufficiently long to allow to stabilize a speed-controlled pickup jump to a constant velocity v. The jump, therefore, covers a stabilization time, a series of track crossings as well as the whole abnormal region. Three detectors for mirror, groove and defect are implemented in order to determine the region type. Two factors need to be measured in order to solve the above equation (2), namely the time period T1 of a single track crossing and the time period T2 of the region crossing.

Figure 5:
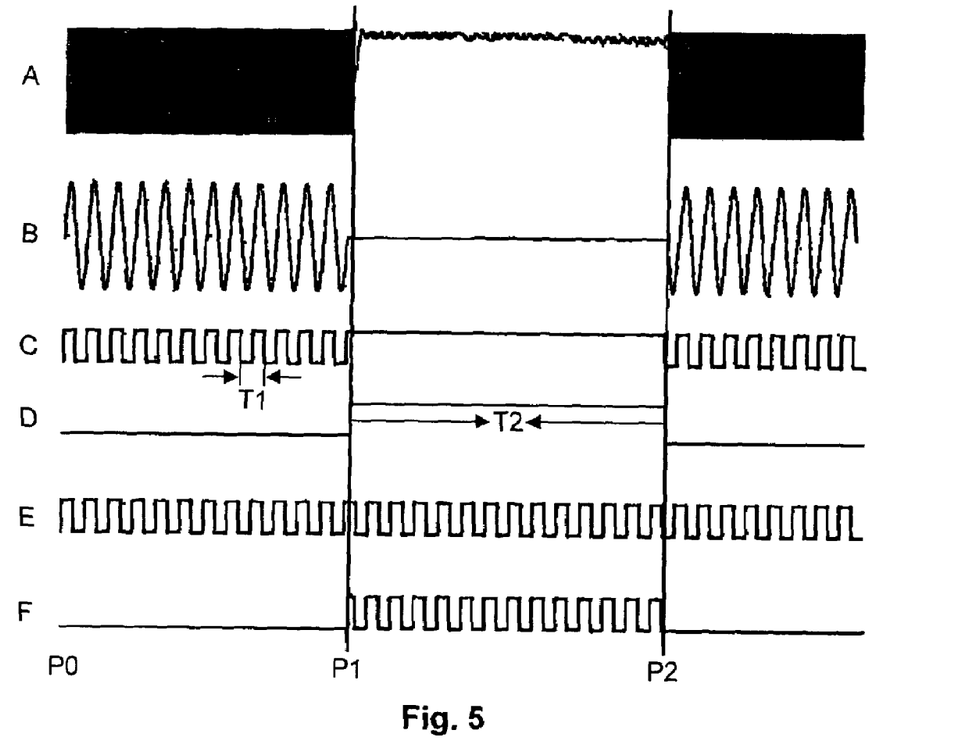
FIG. 5 shows the characteristics of different signals when crossing a mirror region.

The signals used for determining T1 and T2 are shown in FIG. 5. Signal A is the data signal HF, signal B is a track crossing signal TC, signal C is the digitized track crossing signal, signal D is a detector output signal, signal E is the output of a track crossing PLL, and signal F is an input signal for a counter. T1 and T2 are obtained using the digitized track crossing signal C and the detector output signal D. Just before the abnormal region, when a stable jump velocity is achieved, the time period T1 of single track crossing is determined 243 using a counter. Once the abnormal region is reached at a point P1, the track crossing signal B is no longer available. Instead, the detector signal D is emitted indicating either a groove, a mirror or a defect region. The detector signal D initiates a further counter, which continues counting until the detector output signal D goes low at the end P2 of the abnormal region, and which measures 244 the time T2. When both time periods T1 and T2 have been determined the length of the abnormal region in track crossing number equivalents is obtained 245 from equation (2).

An alternative method, the phase locked loop (PLL) method, is depicted in FIG. 4b). Similar to the time measurement method, also the PLL method uses a speed controlled pickup jump for measuring the time period T1 of a single track crossing. After detection 320 of the abnormal region the pickup jumps 321 to a start position P0 just before the abnormal region. Then a speed-controlled jump is initiated 322. However, instead of also measuring the time period T2 while crossing the abnormal region, a PLL is locked onto the track crossing signal B or the digitized track crossing signal C before reaching the beginning of the abnormal region. The PLL delivers a track crossing signal E. Again three detectors are implemented for indicating the region type. Either the groove detector, the mirror detector or the defect detector signals the beginning of the abnormal region. When crossing the abnormal region, no track crossing signal B is available. Therefore, the track crossing signal is substituted by the continuous PLL output pulses E representing imaginary track crossings. The PLL output pulses E are used as an input signal F for a counter, which after a reset to zero 323 sums up 324 the number of PLL periods during crossing the region. After crossing the abnormal region, the PLL is locked again to the track crossing signal B. The number of PLL periods counted during crossing the abnormal region is equivalent to the number of virtual track crossings, which allows to calculate 325 the region length.

Figure 6:
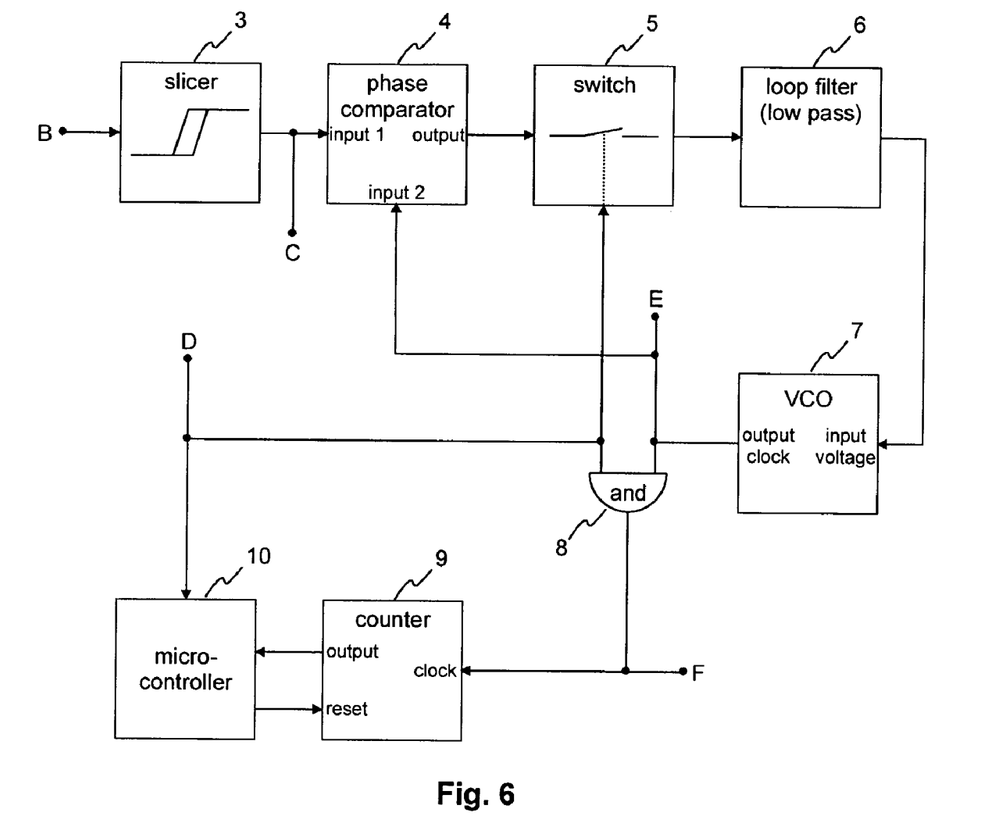
FIG. 6 schematically depicts a track crossing PLL.

In FIG. 6 a hardware implementation and the signal components necessary for realizing the above track crossing PLL are schematically depicted. The related waveforms are shown in FIG. 5. The analog track crossing signal B is transformed into a digital waveform C by a slicer 3 and input into a first input (input 1) of a phase comparator 4. A switch 5, a loop filter 6 and a voltage controlled oscillator (VCO) 7 complete the function of a phase-locked loop (PLL). Connecting the output of the VCO to a second input (input 2) of the phase comparator 4 closes the PLL loop. If the track-crossing signal B is available (P0 to P1), the switch 5 is closed and the output signal of the VCO 7 is controlled to be in phase with the input signal (cf. signals B and C). When a black dot or a mirror zone is detected, the detector signal D changes and opens the switch 5. Therefore, the output of the loop filter 6 holds the last voltage and forces the VCO 7 to maintain the momentary frequency. Over the whole duration of the zone (P1 to P2), the missing pulses are substituted by the PLL. Using an AND gate 8, the substituted pulses are led to a counter 9, which starts counting at the point P1 and stops at the point P2. In the end, the content of the counter 9 represents the length of the abnormal zone. A micro controller 10 resets the counter 9 at P1, reads out the content at or after P2 and provides this information for further processing.

As indicated before, the above described methods for determining the length of an abnormal region are not applicable to wrong structure and wrong bitrate abnormal regions. Therefore, when a wrong structure or a wrong bitrate region needs to be evaluated, the pickup does not simply cross the region simulating the tracks to pass, but also reads the data paying special attention to the sync signal used for synchronizing the data transfer. These sync signals are part of each data packet and are detected by a sync-detector. In order to differentiate between different syncs, a plurality of sync-detectors or a variable sync detector are favorably implemented.

Figure 7:
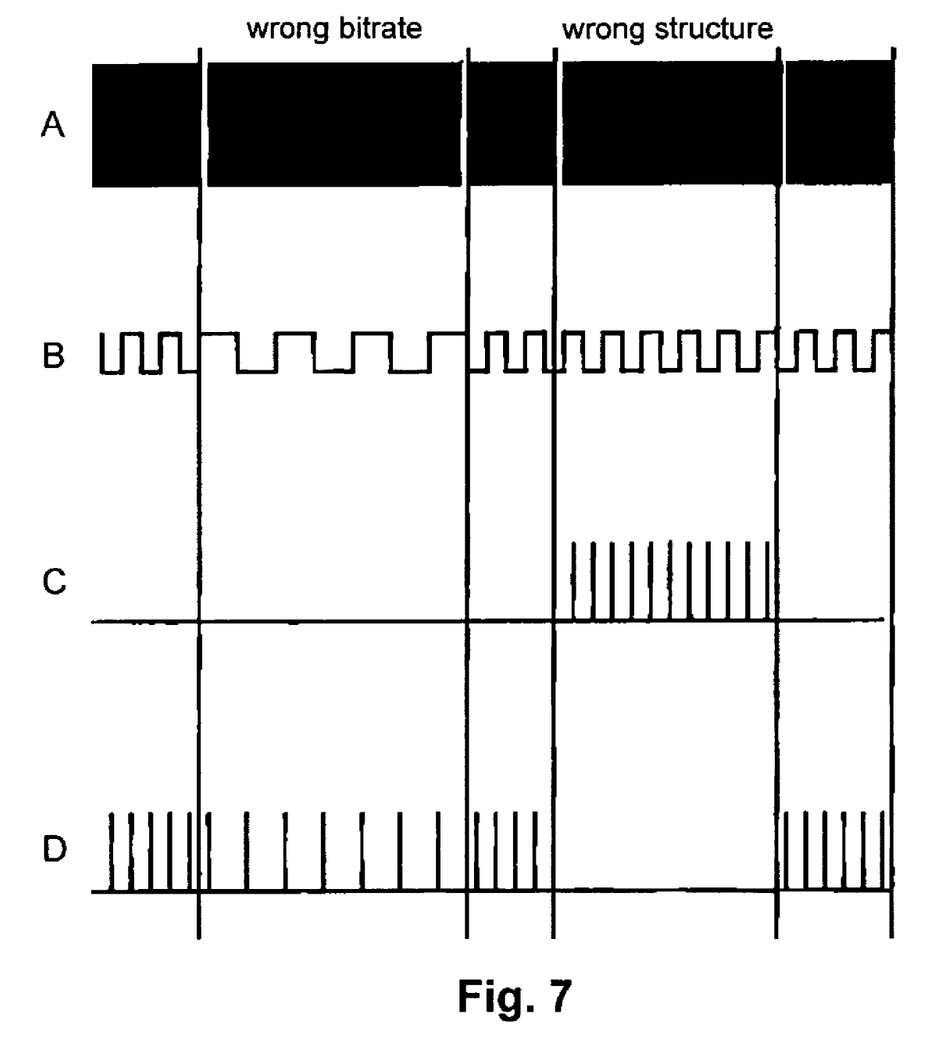
FIG. 7 shows the characteristics of different signals when crossing a wrong bitrate or wrong structure region.

The behavior of PLL and sync signals in wrong bitrate and wrong structure regions is shown in FIG. 7. The figure allows to explain the signal evaluation process for both types of abnormal region. Signal A indicates the data signal HF, signal B is the PLL signal of a bit clock PLL, i.e. of the PLL for generating the bit clock from the HF signal, signal C is a sync signal for the type of structure encountered in the wrong structure region, and signal D is the sync signal as reproduced assuming a correct structure. In case of a wrong structure region, the sync-detector for the wrong structure detects the wrong syncs. A counter is initiated as soon as the first wrong sync signal is detected. The counter is stopped as soon as the wrong sync signal is missing. The number of wrong syncs allows to calculate the length of the wrong structure region.

A wrong bitrate special region generates a similar HF pattern as the normal data structure on the recording medium. Also the sync signals are comparable. Therefore, the data frequency is investigated. By evaluating the PLL applied for the region length calculation for defect, mirror and groove regions, a frequency jump of the PLL is noticed on entering and leaving the wrong bitrate region, as indicated in signal D. Since the bitrate is changed in wrong bitrate regions, also the data packet transmission rate is changed. Therefore, a different number of syncs located in the data packets is transmitted compared to the correct bitrate operation. The correct sync signal is observed during the complete abnormal region checking process. As soon as the correct sync signal misses, i.e. when an abnormal region is encountered, a counter is started counting the number of syncs following a missing sync. In addition, the PLL is checked for a frequency jump. Since the number of skipped syncs at the end of the abnormal region is known, the region length can be calculated.

The invention claimed is:

1. Method for analyzing an abnormal region on an optical recording medium, including the steps of:
   detecting a change from a normal to an abnormal region;
   making a scan perpendicular to the track direction over the abnormal region in response to the detecting step until a normal region is reached at the end of the scan;
   obtaining information on the type of abnormal region during the scan by evaluating a track crossing signal;
   determining the radial extension of the abnormal region perpendicular to the track direction; and
   determining the type of the abnormal region based on the information obtained during the scan.

2. Method according to claim 1, wherein the step of determining the type of the abnormal region further includes:
   differentiating between a first group of types and a second group of types of abnormal region based on the obtained information.

3. Method according to claim 2, wherein the step of differentiating between a first group of types and a second group of types of abnormal region based on the obtained information includes:
   classifying an abnormal region as belonging to the first group of types if an evaluation of the abnormal region does only take a short time compared with the evaluation of the abnormal region in the second group of types; and
   otherwise classifying an abnormal region as belonging to the second group of types.

4. Method according to claim 1, wherein the step of obtaining information on the type of abnormal region during the scan further includes evaluating a data signal obtained from the optical recording medium.

5. Method according to claim 1, wherein the step of measuring the radial extension of the abnormal region includes one of:
   measuring the time needed for scanning over the abnormal region; and
   counting a number of pulses emitted by a phase locked loop during scanning over the abnormal region, the phase locked loop replicating a track crossing signal obtained before reaching the abnormal region in the scanning step.

6. Method according to claim 1, further including the steps of:
   jumping back to the start of the abnormal region;
   reading data stored in the abnormal region; and
   evaluating the data for determining the type of abnormal region.

7. Method according to claim 6, wherein the step of evaluating the data for determining the type of abnormal region includes at least one of:
   evaluating a sync signal included in the data; and
   evaluating the data frequency in the abnormal region.

8. Method according to claim 6, wherein the step of measuring the radial extension of the abnormal region includes counting the number of wrong syncs in the abnormal region.

9. Method according to claim 1, further including the step of storing the position, the radial extension and/or the type of the abnormal region on the optical recording medium.

10. Method according to claim 1, wherein the types of abnormal region include at least one of a groove region, a mirror region, a defect region, a wrong bitrate region and a wrong structure region.

11. Method according to claim 1, further including the step of:
   differentiating between a first group of types and a second group of types of abnormal region based on the obtained information, wherein
   an abnormal region is classified as belonging to the first group of types if the abnormalities of the detected signal are caused by physical characteristics of the recording medium; and
   an abnormal region is classified as belonging to the second group of types if the abnormalities of the detected signal are caused by erroneous data.

* * * * *